(No Model.)

W. H. BINNS.
BRAKE MECHANISM FOR BICYCLES.

No. 520,017. Patented May 15, 1894.

Witnesses:
John Enders Jr
H. W. A. Nott

Inventor
William H. Binns,
by Robert Burns
Attorney.

UNITED STATES PATENT OFFICE.

WILLIAM H. BINNS, OF CHICAGO, ILLINOIS, ASSIGNOR TO THE MONARCH CYCLE COMPANY, OF SAME PLACE.

BRAKE MECHANISM FOR BICYCLES.

SPECIFICATION forming part of Letters Patent No. 520,017, dated May 15, 1894.

Application filed January 10, 1894. Serial No. 496,403. (No model.)

*To all whom it may concern:*

Be it known that I, WILLIAM H. BINNS, a citizen of the United States, residing at Chicago, in the county of Cook and State of Illinois, have invented a certain new and useful Brake Mechanism for Bicycles; and I do hereby declare the following to be a full, clear, and exact description of the same, reference being had to the accompanying drawings, forming a part of this specification.

This invention relates more especially to the brake mechanism of the safety type of bicycles, in which the forward wheel is used for steering purposes, and the rear wheel as a driver.

The object of the present improvement is to provide a simple and durable attachment of the eye bracket by which the stem of the brake shoe is guided in its movement, to the main frame of the bicycle, in a readily detachable manner, so that the whole brake mechanism is capable of ready removal or replacement in an easy and rapid manner. I attain such object by the construction and arrangement of parts illustrated in the accompanying drawings, in which—

Figure 1:
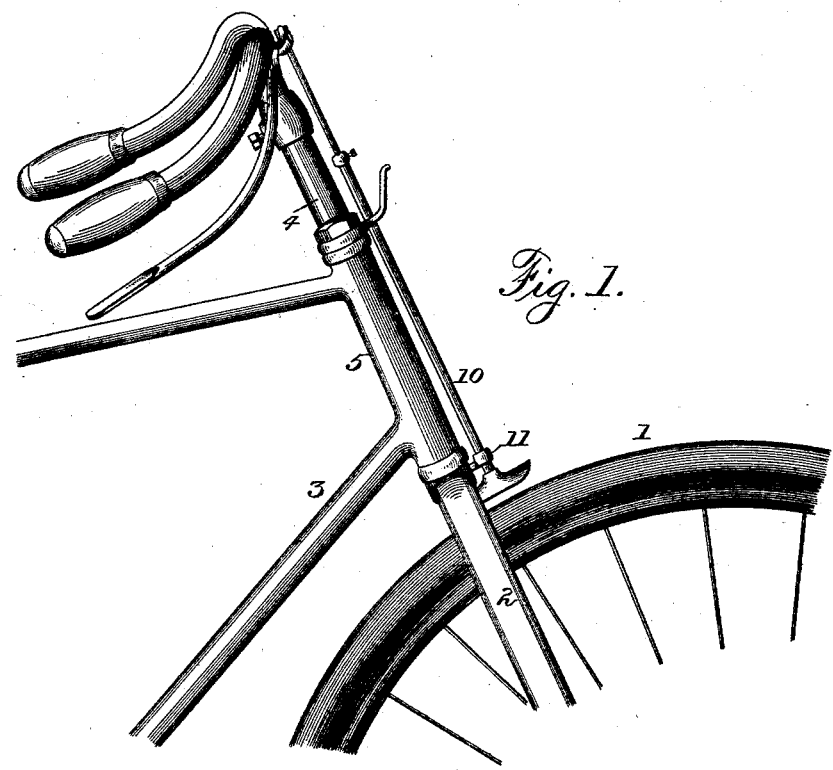
Figure 2:
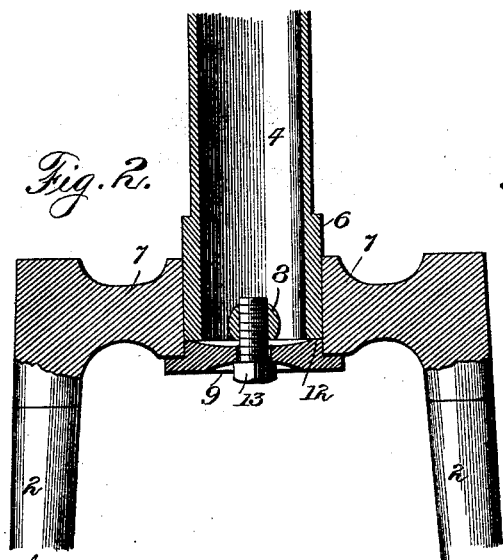

Figure 1, is a perspective view, illustrating the general arrangement of the present invention; Fig. 2, an enlarged detail transverse sectional elevation; and Fig. 3, an enlarged longitudinal section at right angles to Fig. 2.

Similar numerals of reference indicate like parts in the several views.

Referring to the drawings 1, represents a portion of the forward wheel of a safety bicycle, the carrying forks 2, which are journaled in the main frame 3, by the pivot shank 4, having suitable bearing in the tubular bearing sleeve 5, at the forward end of the main frame of the bicycle, as usual to the present class of bicycles.

In the construction shown in the drawings, the lower portion of the tubular pivot shank, is reinforced by the surrounding collar 6, integral with such shank, and adapted to fit closely into a cylindrical orifice in the cross head 7, of the forks, connection between the parts being made by a cross pin 8, and the brazing or sweating of the parts together after they are assembled and such cross pin 8, inserted.

Figure 3:
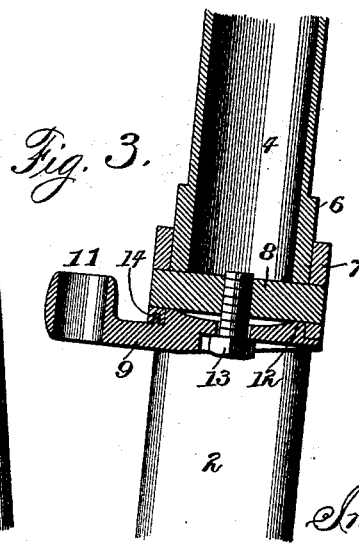

The guide bracket 9, by which the lower end of the brake shoe rod or stem 10, is guided, is formed with the usual forwardly extending eye 11, for the passage and guidance of the brake stem, and in the present invention the main body of such bracket piece is formed on its upper surface with a raised circular rim 12, having the same diameter as the bore of the cylindrical recess in the cross head 7, into the lower end of which it fits, and is secured in place by a headed screw 13, passing through a central orifice in the head of said bracket, and screwing into a screw threaded orifice in the cross pin 8, as shown in Figs. 2 and 3, the proper position of said bracket with relation to the other parts of the bicycle being insured by a pin projection 14, on said bracket entering an orifice formed in the cross head 7, as illustrated in Fig. 3.

Having thus fully described my said invention, what I claim as new, and desire to secure by Letters Patent, is—

1. In a bicycle brake mechanism, the combination with a bicycle steering fork, the cross head of which is provided with a fixed piece within its cylindrical orifice, of the guide bracket 9, formed with a guide eye 11, and a raised circular rim 12, adapted to fit the lower end of the orifice in the cross head, and a headed screw 13, screwing into said fixed piece and securing the bracket in place, substantially as set forth.

2. In a bicycle brake mechanism, the combination with a bicycle fork, the cross head of which is formed with a cylindrical orifice and a cross pin 8, of the guide bracket 9, formed with a guide eye 11, and a raised circular rim 12, adapted to fit the lower end of the circular orifice in said cross head, and a headed screw 13, screwing into a screw threaded orifice in the cross pin 8, to secure the parts together in a readily detachable manner, substantially as set forth.

3. In a bicycle brake mechanism, the combination with a bicycle steering fork, the cross head of which is provided with a fixed piece within its cylindrical orifice, of the guide bracket 9, formed with a guide eye 11, and a raised circular rim 12, adapted to fit the lower end of the orifice, in the cross head, a headed screw 13, screwing into said fixed piece and securing the bracket in place, and a pin projection 14, on the one part entering a recess in the other part to insure proper relative position of the parts, substantially as set forth.

In testimony whereof witness my hand this 2d day of January, 1894.

WILLIAM H. BINNS.

In presence of—
ROBERT BURNS,
JOHN ENDERS, Jr.